Dec. 10, 1968 R. B. GILHAM 3,415,005
WATER-SOLUBLE CASTING WEIGHT AND METHOD FOR DISPENSING SAME
Filed May 13, 1966
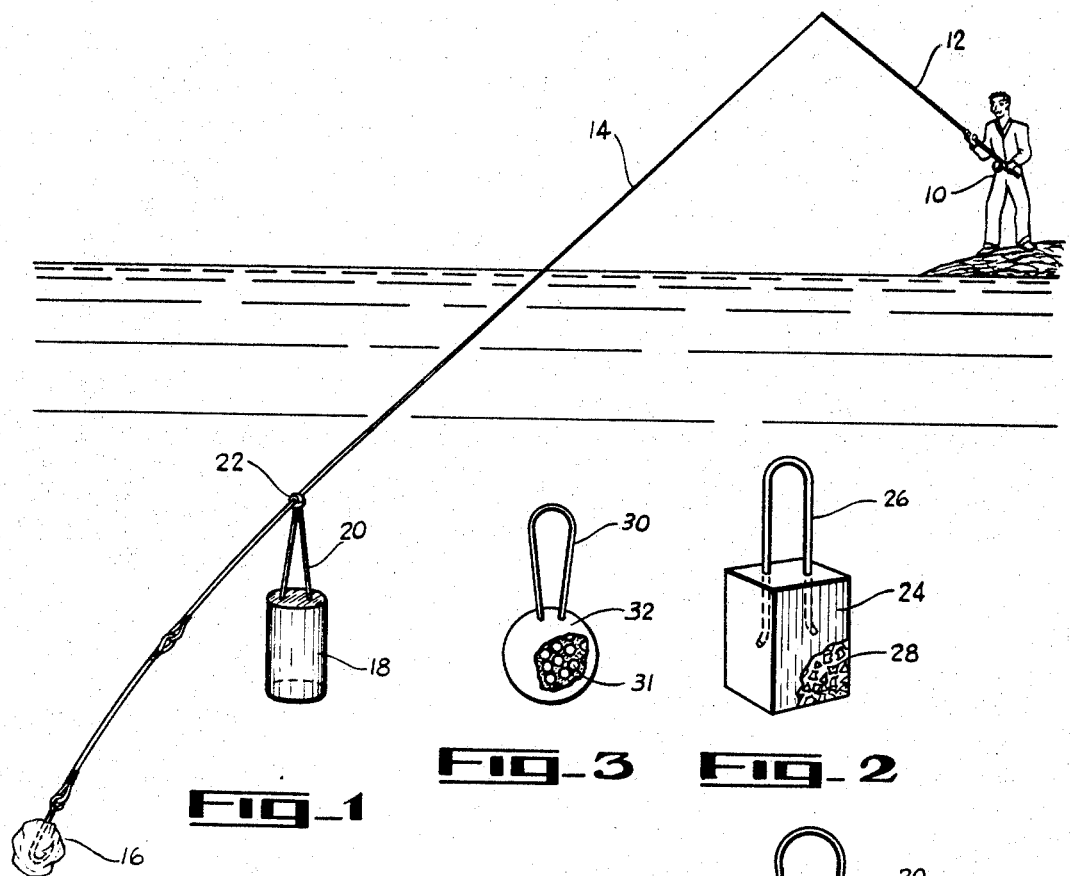
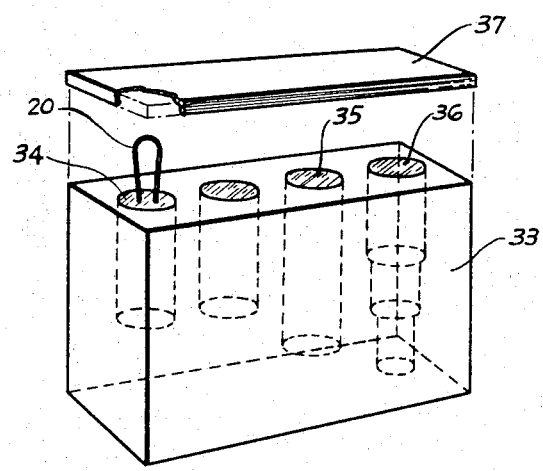
INVENTOR.
ROBERT B. GILHAM.
BY
ATTORNEY.

United States Patent Office 3,415,005
Patented Dec. 10, 1968

3,415,005
WATER-SOLUBLE CASTING WEIGHT AND
METHOD FOR DISPENSING SAME
Robert B. Gilham, 1621 Ocean Front,
San Diego, Calif. 92107
Filed May 13, 1966, Ser. No. 549,965
11 Claims. (Cl. 43—43.12)

ABSTRACT OF THE DISCLOSURE

A casting weight comprising a solid body of water-soluble material that may be ice or other lighter than water material that has an attachment means embedded therein for securing the casting weight to a fishing line, and the method of making an ice casting weight and dispensing it at the point of use.

BACKGROUND OF THE INVENTION

The use of casting weights and sinkers on fishing lines is well known. There are usually several sizes of such weights that are selectively attached to the fishing line. However, the amount of casting weight required to achieve a given casting distance is often not the same as the weight the fisherman wants on the line after the line has been cast and is in the water. So after the fisherman makes a good cast, his line then sinks too deep into the water.

It is therefore desirable to have an inexpensive casting weight that provides the line weight required to achieve long casting distances and yet that will dissolve rapidly allowing the line to locate at the desired depth in the water. It is also desirable to have a method and apparatus for easily and cheaply making and dispensing such casting weights for use by fishermen at the fishing site. It should be recognized that dissolvable casting weights can be used only once, so the fabrication cost and the cost of dispensing such weights is a major consideration in their use.

It is therefore an object of this invention to provide a new and improved casting weight.

It is another object of this invention to provide a new and improved method of dispensing a dissolvable casting weight.

It is another object of this invention to provide a new and improved water-soluble casting weight.

It is another object of this invention to provide a new and improved water-soluble casting weight, the weight of which can be selectively varied at the fishing site.

It is another object of this invention to provide a new and improved water-soluble casting weight that is inexpensive to make and relatively inexpensive to dispense.

It is another object of this invention to provide a new and improved water-soluble casting weight that can have considerable weight.

It is another object of this invention to provide a new and improved water-soluble casting weight that can also be used to chum the area around the fishing hook or lure.

It is another object of this invention to provide a new and improved water-soluble casting weight that may be rapidly attached to a fishing line.

To accomplish the foregoing objects, my invention comprises a casting weight body that is made of water-soluble material. The water-soluble material may comprise any of several known water-soluble materials as, for example, sodium chloride, a water-soluble material that is also an effervescent material, ice, or the like. I have found particular advantage and novelty in using ice as my water-soluble material for reasons that will become more apparent hereinafter. While the casting weight of my invention may have any suitable shape such as square, circular, cylindrical or the like; I have found particular advantage in using the cylindrical shape. Embedded in the body is a means for securing the weight to the fishing line that can take the form of a metal loop for attaching to a fastener already installed in the fishing line or preferably a portion of fishing line or leader that is tied directly to the fishing line.

The water-soluble material used is inexpensive and the constructed casting weight will be easily dispensed in a package for sale and use at the fishing site. In the preferred use of ice, as the water-soluble material, I employ the method of freezing the casting weight body to the desired form with the attaching means secured therein. The casting weights are normally frozen in a case or may be placed in a case or container after freezing. The case is made of insulating material that keeps the casting weights in the substantially frozen condition until the time of use. Thus the frozen casting weights are dispensed or sold to fishermen in the container and are carried by fishermen for later use in casting at the fishing site.

The frozen casting weights may be quickly and easily removed from the case or container and rapidly attached by the embedded loop of line to the fishing line by a well known girth hitch knot or the like. After casting, the ice will immediately dissolve in the water and the line will then rise or sink to a depth in the water that is determined by the weight of the line and the weight of other sinkers or the like on the line.

In my invention, shot, BB's or the like can be mixed into the water soluble material increasing the weight of the casting weight to a greater range of selective magnitudes. Further, bits of anchovy or other fish attracting material may be mixed with the water-soluble material to attract fish to the fishing area. This latter feature of my invention finds particular advantage in, for example, mixing anise oil in solution with water that is frozen to make the ice casting weights. In addition, I find particular advantage in giving the casting weight body a cylindrical shape. The casting weight may then have selective lengths that will have corresponding selective weights. Also marks may be placed on the casting weights that identify weight divisions. These marks may be used by the fisherman to cut off portions of the cylindrical length of the casting weight and thus selectively vary the weight of the casting weight immediately prior to its use. The weight of the casting weight can thus be varied at the fishing site without requiring the use of more than one casting weight for a given cast.

There are many other objects and advantages of my invention that will become more apparent in reading the following detailed description, in which:

FIGURE 1 is a view of a casting weight of my invention that is secured to a fishing line that is being cast.

FIGURE 2 is a view partly in section of another embodiment of the casting weight of my invention that has a rectangular shape.

FIGURE 3 is a view partly in section of another embodiment of my invention.

FIGURE 4 is a perspective view of a case for carrying the casting weights of my invention.

FIGURE 5 is a view of a cylindrical casting weight of my invention.

Referring now to FIGURE 1, a fisherman 10 is using a normal fishing rod 12, line 14, and fishing hook or lure 16 to make a cast. While other sinkers and the like (not shown) may be attached to the line, the casting weight 18 of my invention is attached to the line at any suitable point along its length to increase the line weight for casting. The cylindrical casting weight 18 may have any other desirable shape such as the shapes shown in FIGURES 2 and 3 or other shapes such as oval or the like. It is necessary that the shapes be aerodynamically shaped to achieve low wind resistance.

The entire body of the casting weight 18 is made of water-soluble material. It is attached to the fishing line 14 by a loop of line 20; that is, a short length of fishing line such as light weight fishing line, mono-filament or the like. The loop of line is attached to line 14 at 22 by a girth hitch knot or other suitable knot that may be easily untied after the line has been cast and the casting weight 18 is dissolved. Other means may be used to attach the casting weight to the fishing line, such as a metal loop 26 (see FIGURE 2) that may be attached to the line 14 by a well known snap link (not shown) in the line 14. However, the ends of the metal loop 26 or the line 30, see FIGURE 3, will be embedded in the water-soluble material at the time the water-soluble casting weight is made.

As previously stated the water-soluble casting weight may be made from any suitable water-soluble material such as sodium chloride, ice, or the like. It can further be made from water-soluble effervescent or water-soluble material having effervescent material mixed therewith. The effervescent material has obvious fish attracting capabilities. The water-soluble material 24 may also be selectively embedded with, for example, bits of fish 28, such as anchovy, shrimp, or the like for attracting fish as the bits are distributed in the water around the bait or lure as the water-soluble casting weight dissolves. The fish attracting material in the casting weight can be dispensed at a point leading the fishing bait or lure by normal slight trolling of the fishing line. Additionally, of course, other fish attracting material such as anise oil may be mixed with the water-soluble material. Also additional weight material such as shot 31, or the like may be embedded in the water-soluble body 32 to provide a heavier casting weight.

The use of ice as the water-soluble material has particular advantage in that it is inexpensive to make, may be made with an inexpensive material and can be carried to the fishing site for use in inexpensive insulated carriers. Also ice does not place foreign substances in the water around the fishing line, has sufficient body strength to carry additional substances in suspension such as bits of fish, shot, or the like, can be lighter than the water, if desired, and will dissolve in water at an expected time rate.

In using ice as the water-soluble material, I use an insulated case that may be made of any inexpensive, cheap and suitable insulating material such as Styrofoam or the like. The case can have a shape substantially as shown in FIGURE 4 with a plurality of cavities 34, 35, and 36 therein for receiving casting weights made of ice, such as casting weights 18 or 38. The cavities can have different lengths providing a selection of weights. While in the drawing the casting weights are shown as being long relative to the diameter, the casting weight can have a shorter length and a greater diameter. The cylindrical-shaped casting weight has a low wind resistance and also lends itself to having longitudinal portions removed to vary the weight. If the casting weight is made of ice at a point other than in cavities 34, 35 and 36 then it can be made with ridges at spaced intervals, along its length, or marked at spaced intervals. These marks identify given lengths and weights. When the casting weight is made as by direct freezing in cavity 36, then a shape can be as shown in FIGURE 5, with successively reduced diameters 40 and 42 that permit easy removal from the cavity 36 and that identify successive lengths and weights.

In one embodiment of the method of my invention the cavities in case 33 are filled with water and placed in a refrigerated compartment. Loops of lines 20 having knots 39 are inserted into the water in the cavities. If shot 31, anchovies 28, anise oil or the like is to be mixed into the ice, then this material is placed into the cavities 34, 35 and 36. After the casting weights are frozen, the container or case 33 is covered with cover 37 and moved to the point of sale. The cases can be refrigerated if necessary, during this period of time between making and selling. The casting weights and container are sold to fishermen by the case. The fishermen then at the time of use removes a given casting weight and attachs the casting weight to the fishing line and makes the cast. Should the fisherman desire a weight different from that available in the case 33, he will selectively remove lengths of the casting weight along the reduced diameter sections as desired. The amount of melting that would occur would not be large because of the insulating capabilities of the container. That melting that does occur merely aids in easing the removal of the casting weight from the cavities 34, 35, and 36.

I claim:
1. A water-soluble casting weight comprising,
a solid body of water-soluble material,
attachment means for releasably attaching said body to a fishing line,
said attachment means having a portion embedded in said body,
and said water-soluble material is ice.
2. A water soluble casting weight as claimed in claim 1 in which said body has a substantially cylindrical shape.
3. A water soluble casting weight as claimed in claim 2 in which said cylindrically shaped body comprises a plurality of lengths with each length having a successively larger diameter.
4. A water soluble casting weight as claimed in claim 2 in which said attachment means comprises a loop of line with the ends of said loop being embedded in said body.
5. A water-soluble casting weight as claimed in claim 1 in which said ice has fish attracting substances mixed therein.
6. A water-soluble casting weight as claimed in claim 1 in which said ice has bits of fish embedded therein.
7. A water-soluble casting weight comprising,
a solid body of water-soluble material,
attachment means for releasably attaching said body to a fishing line,
said attachment means having a portion embedded in said body,
and said water-soluble material is lighter than water.
8. A water-soluble casting weight as claimed in claim 7 in which said water-soluble material has a second heavier material mixed therewith for increasing the weight of said body.
9. A water-soluble casting weight as claimed in claim 7 in which said water-soluble material has fish attracting substances mixed therewith.
10. A water-soluble casting weight as claimed in claim 9 in which said water-soluble material has bits of fish embedded therein.
11. The method of making and attaching a plurality of water-soluble casting weights comprising the steps of,
employing a light weight, small in size container of thermal insulating material having a plurality of cylindrically shaped cavities therein, with the volume of each cavity being the size of an individual casting weight,
placing a freezable solution in said cavities,
placing at least one end of a short length of line in each of said cavities,
freezing said solutions with the ends of said lines embedded therein to form a plurality of individual casting weights,
moving said insulating container with said frozen casting weights to a point of use in substantially said frozen condition,
removing said frozen casting weights from said container,
and securing said frozen casting weights to a fishing line by said length of line.

(References on following page)

References Cited

UNITED STATES PATENTS

| | | | |
|---|---|---|---|
| 1,023,676 | 4/1912 | Pancoast | 43—43.14 |
| 2,197,839 | 4/1940 | Roberts et al. | |
| 2,754,614 | 7/1956 | Yakel | 43—43.12 |
| 2,814,902 | 12/1957 | Matteson | 43—43.12 |
| 2,874,048 | 2/1959 | Walldov. | |

FOREIGN PATENTS

| | | |
|---|---|---|
| 1,054,574 | 10/1953 | France. |

OTHER REFERENCES

Popular Mechanics magazine of June 1962, page 166, fishing hint by Joseph B. Stephens.

SAMUEL KOREN, *Primary Examiner.*

D. J. LEACH, *Assistant Examiner.*

U.S. Cl. X.R.

43—44.99